(12) United States Patent
Lee et al.

(10) Patent No.: US 8,548,088 B2
(45) Date of Patent: Oct. 1, 2013

(54) METHOD FOR TRANSMITTING/RECEIVING DATA IN A MULTIPLE-INPUT MULTIPLE-OUTPUT SYSTEM USING MULTI-CARRIER

(75) Inventors: Moon Il Lee, Gyeonggi-do (KR); Bin Chul Ihm, Gyeonggi-do (KR); Hyun Soo Ko, Gyeonggi-do (KR); Sung Ho Park, Gyeonggi-do (KR); Wook Bong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 893 days.

(21) Appl. No.: 12/674,413

(22) PCT Filed: Aug. 20, 2008

(86) PCT No.: PCT/KR2008/004839
§ 371 (c)(1),
(2), (4) Date: Feb. 19, 2010

(87) PCT Pub. No.: WO2009/025493
PCT Pub. Date: Feb. 26, 2009

(65) Prior Publication Data
US 2011/0274200 A1      Nov. 10, 2011

Related U.S. Application Data

(60) Provisional application No. 60/957,337, filed on Aug. 22, 2007.

(30) Foreign Application Priority Data

Apr. 10, 2008   (KR) .................. 10-2008-0033326

(51) Int. Cl.
*H04B 15/00*   (2006.01)

(52) U.S. Cl.
USPC ............ 375/285; 375/260; 375/296; 375/347

(58) Field of Classification Search
USPC ................. 375/130–133, 135–136, 140–141, 375/146–148, 229, 232, 259–260, 285, 295–296, 375/299, 316, 340, 346–350
See application file for complete search history.

(56) References Cited

U.S. PATENT DOCUMENTS

| | | | |
|---|---|---|---|
| 2003/0073464 A1 | 4/2003 | Giannakis et al. | |
| 2003/0236808 A1* | 12/2003 | Hou | 708/400 |
| 2008/0117999 A1* | 5/2008 | Kadous et al. | 375/267 |

FOREIGN PATENT DOCUMENTS

WO     2005022815     3/2005

* cited by examiner

*Primary Examiner* — Sam K Ahn
*Assistant Examiner* — James M Perez
(74) *Attorney, Agent, or Firm* — Lee, Hong, Degerman, Kang & Waimey (57) ABSTRACT

A method for transmitting/receiving data in a Multiple Input Multiple Output (MIMO) communication system is disclosed. The data transmission method includes determining a precoding matrix to be a part of a phase-shift-based precoding matrix, determining a first diagonal matrix for phase shift to be a part of the phase-shift-based precoding matrix, determining a unitary matrix to be a part of the phase-shift-based precoding matrix, precoding a transmission symbol for each resource using the phase-shift-based precoding matrix to produce precoded data, and transmitting the precoded data, wherein the phase-shift-based precoding matrix is determined by the product of the precoding matrix, a Hermitian matrix of the unitary matrix, the first diagonal matrix, and the unitary matrix.

16 Claims, 4 Drawing Sheets

METHOD FOR TRANSMITTING/RECEIVING DATA IN A MULTIPLE-INPUT MULTIPLE-OUTPUT SYSTEM USING MULTI-CARRIER

CROSS-REFERENCE TO RELATED APPLICATIONS

This application is the National Stage filing under 35 U.S.C. §371 of International Application No. PCT/KR2008/004839, filed on Aug. 20, 2008, which claims the benefit of earlier filing date and right of priority to Korean Application No. 10-2008-0033326, filed on Apr. 10, 2008, and also claims the benefit of U.S. Provisional Application Ser. No. 60/957,337, filed on Aug. 22, 2007.

TECHNICAL FIELD

The present invention relates to a Multiple Input Multiple Output (MIMO) system, and more particularly to a data transmission/reception (Tx/Rx) method using a phase-shift-based precoding matrix in a MIMO system using a plurality of sub-carriers.

BACKGROUND ART

In recent times, with the increasing development of information communication technologies, a variety of multimedia services, and a variety of high-quality services have been developed and introduced to the market, so that demands of wireless communication services are rapidly increasing throughout the world. In order to actively cope with the increasing demands, capacity of a communication system must be increased.

A variety of methods for increasing communication capacity under wireless communication have been considered, for example, a method for searching for a new available frequency band in all frequency bands, and a method for increasing efficiency of limited resources. As representative examples of the latter method, a transceiver includes a plurality of antennas to guarantee an additional space utilizing resources so that a diversity gain is acquired, or MIMO communication technologies for increasing transmission capacity by transmitting data via individual antennas in parallel have been developed by many companies or developers.

Particularly, a Multiple-Input Multiple-Output (MIMO) system using an Orthogonal Frequency Division Multiplexing (OFDM) from among the MIMO communication technologies will hereinafter be described with reference to FIG. 1.

Figure 1:
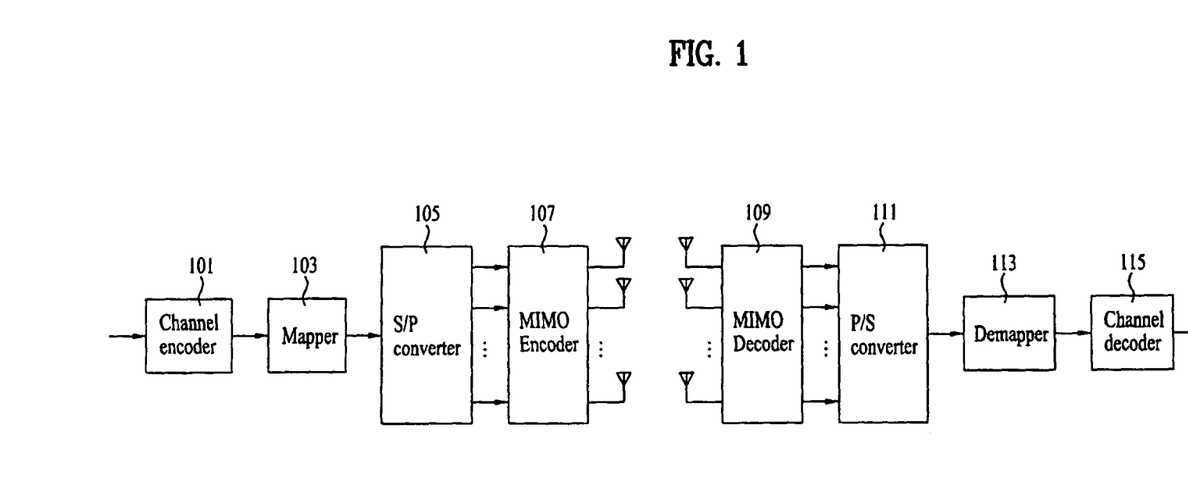
FIG. 1 is a block diagram illustrating a Multiple-Input Multiple-Output (MIMO) system using an Orthogonal Frequency Division Multiplexing (OFDM) scheme from among MIMO transmission/reception schemes.

FIG. 1 is a block diagram illustrating a MIMO-OFDM system.

Referring to FIG. 1, in a transmission end, a channel encoder 101 attaches redundant bits to transmission (Tx) data bits to reduce a negative influence of a channel or noise. A mapper 103 converts data bit information into data symbol information. A serial-to-parallel (S/P) converter 105 converts a serial data symbol into a parallel data symbol so that the parallel data symbol can be loaded on several sub-carriers. A MIMO encoder 107 converts the parallel data symbol into space-time signals.

In a reception end, a MIMO decoder 109, a parallel-to-serial (P/S) converter 111, a demapper 113, and a channel decoder 115 have functions opposite to those of the MIMO encoder 107, the S/P converter 105, the mapper 103, and the channel encoder 101 in the transmission end.

The MIMO OFDM system requires a variety of technologies for increasing a Tx reliability of data, for example, a Space-Time Code (STC) or Cyclic Delay Diversity (CDD) scheme to increase a spatial diversity gain, and a BeamForming (BF) or Precoding scheme to increase a Signal-to-Noise Ratio (SNR). In this case, the STC or CDD scheme has been used to increase a Tx reliability of an open-loop system which is incapable of using feedback information at a transmission end, and the BF or Precoding scheme has been used to maximize the SNR using corresponding feedback information of a closed-loop system which is capable of using feedback information at a transmission end.

Particularly, the CDD scheme for increasing the spatial diversity gain and the precoding scheme for increasing the SNR will hereinafter be described in detail.

A Space-Time Code (STC) scheme successively transmits the same signals under the MIMO environment. However, when the STC-based system repeatedly transmits the same signals under the MIMO environment, the same signals are transmitted via other Tx antennas different from the previous Tx antenna, resulting in the implementation of a spatial diversity gain.

The following table 1 exemplarily a variety of space-time codes (STCs) under the STC-based MIMO encoding.

TABLE 1

| STC Scheme | # of Tx antenna | Rank R | dp, min QPSK |
|---|---|---|---|
| (1) $\frac{1}{\sqrt{2}}\begin{bmatrix} S_1 & -S_2^* \\ S_2 & S_1 \end{bmatrix}$ | 2 | 1 | 1 |
| (2) $\frac{1}{\sqrt{2}}\begin{bmatrix} S_1 \\ S_2 \end{bmatrix}$ | 2 | 2 | 1 |
| (3) $\frac{1}{\sqrt{2(1+r^2)}}\begin{bmatrix} S_1 + jr \cdot S_4 & r \cdot S_2 + S_3 \\ S_2 - r \cdot S_3 & jr \cdot S_1 + S_4 \end{bmatrix}$, $r = \sqrt{5} \pm \frac{1}{2}$ | 2 | 2 | 0.2 |
| (4) $\frac{1}{2}\begin{bmatrix} S_1 & S_2 & S_3 & S_4 \\ S_2^* & -S_1^* & S_4^* & -S_3^* \\ S_3 & -S_4 & -S_1 & S_2 \\ S_4^* & S_3^* & -S_2^* & -S_1^* \end{bmatrix}$ | 4 | 1 | 4 |
| (5) $\frac{1}{\sqrt{2}}\begin{bmatrix} S_1 & S_2 & 0 & 0 \\ -S_2^* & S_1^* & 0 & 0 \\ 0 & 0 & S_3 & S_4 \\ 0 & 0 & -S_4^* & S_3^* \end{bmatrix}$ | 4 | 1 | 1 |
| (6) $\frac{1}{2}\begin{bmatrix} S_1 & -S_2^* & S_3 & -S_6^* \\ S_2 & S_1^* & S_6 & S_5^* \\ S_3 & -S_4^* & S_7 & -S_8^* \\ S_4 & S_3^* & S_8 & S_7^* \end{bmatrix}$ | 4 | 2 | 1 |

In Table 1, individual rows of each matrix are indicative of individual antennas, and individual columns of the matrix are indicative of time.

Figure 2:
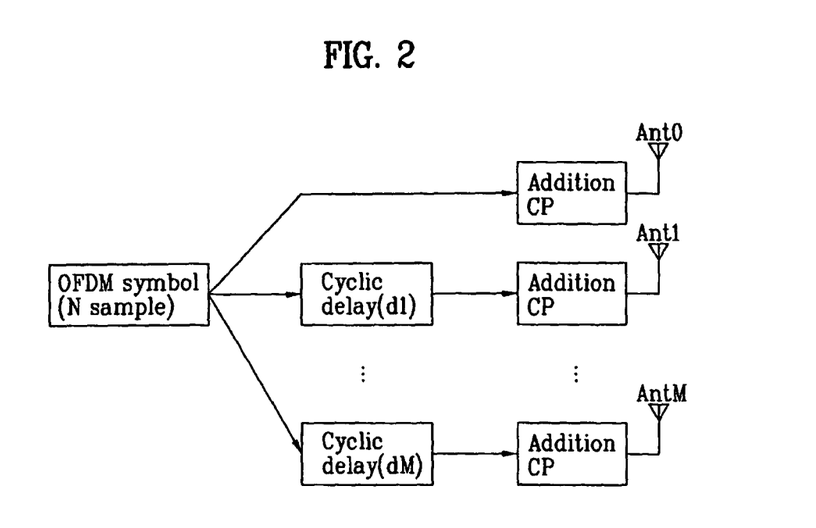
FIG. 2 is a conceptual diagram illustrating a data transmission method of a MIMO system using a Cyclic Delay Diversity (CDD) scheme according to one embodiment of the present invention.

FIG. 2 is a conceptual diagram illustrating a data transmission method of a MIMO system using a Cyclic Delay Diversity (CDD) scheme according to one example.

The CDD scheme is as follows. When a system equipped with several Tx antennas transmits the OFDM signal, the CDD system assigns different delays, different levels, or different amplitudes to all the antennas, such that the individual antennas transmit signals with the different delays, levels, or amplitudes. As a result, the reception end can acquire a frequency diversity gain.

OFDM symbols are divided by the S/P converter and the MIMO encoder, and then the divided OFDM symbols are transmitted to individual antennas. Then, the resultant symbols are added to a cyclic Prefix (CP) for the prevention of an inter-channel interference, and the added result is transmitted to the reception end. In this case, although a data sequence transmitted to a first antenna is transmitted to the reception end without any change, another data sequence transmitted to the next antenna (i.e., a second antenna) is cyclically delayed by a predetermined number of samples as compared to the case of the previous antenna (i.e., the first antenna).

Figure 3:
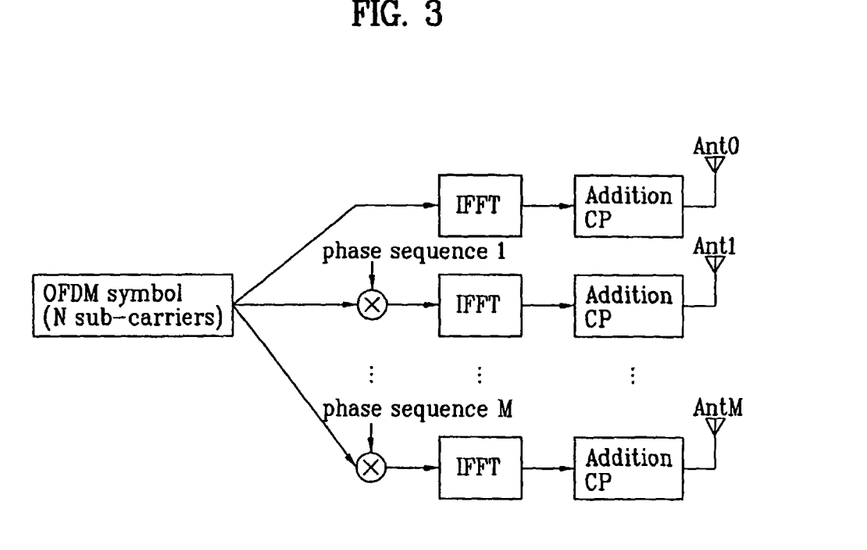
FIG. 3 is a conceptual diagram illustrating a data transmission method of a MIMO system using a Cyclic Delay Diversity (CDD) scheme according to another embodiment of the present invention.

FIG. 3 is a conceptual diagram illustrating a data transmission method of a MIMO system using a Cyclic Delay Diversity (CDD) scheme according to another example.

Referring to FIG. 3, if the CDD scheme is implemented in a frequency domain, the cyclic delay may be represented by the product of phase sequences. In other words, as can be seen from FIG. 3, different phase sequences (Phase sequence 1~Phase sequence M) of individual antennas are multiplied by individual data sequences of the frequency domain, an Inverse Fast Fourier Transform (IFFT) is performed on the multiplied result, and the IFFT result may be transmitted to the reception end. The above-mentioned CDD scheme of FIG. 3 may be referred to as a phase shift diversity scheme.

Figure 4:
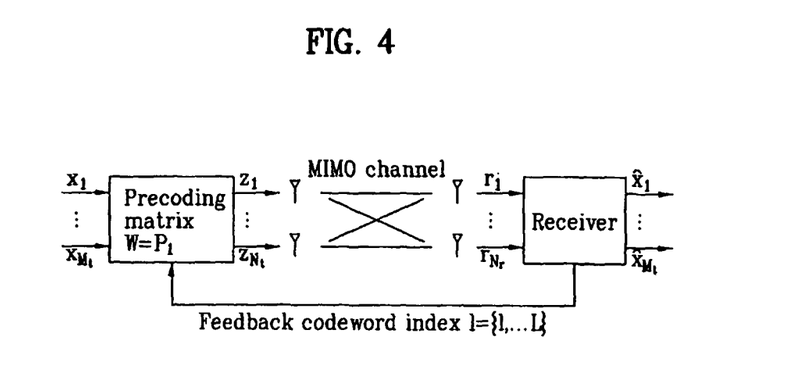
FIG. 4 is a block diagram illustrating a transmission/reception end of a codebook-based precoding MIMO system according to the present invention.

FIG. 4 is a block diagram illustrating a transmission/reception end of a codebook-based precoding MIMO system.

In the meantime, there are a variety of precoding schemes, i.e., a codebook-based precoding method, and a method for quantizing channel information and feeding back the quantized channel information. In this case, the codebook-based precoding method is used when feedback information is limited in the closed-loop system. Specifically, the codebook-based precoding method feeds back the index of a pre-recognized precoding matrix to the transmission end to get SNR gain.

In this case, each of the transmission/reception ends has a finite precoding matrix ($P_1$~$P_L$). The reception end feeds back an optimum precoding matrix index (l) to the transmission end using channel information, and the transmission end applies a precoding matrix corresponding to the feedback index to transmission data ($\chi_1$~$\chi_{Mt}$). For reference, the following Table 1 shows an exemplary codebook used when feedback information of 3 bits is used in an IEEE 802.16e system equipped with two Tx antennas to support a spatial multiplex rate of 2.

TABLE 2

| Matrix Index (binary) | Column 1 | Column 2 |
|---|---|---|
| 000 | 1 | 0 |
|  | 0 | 1 |
| 001 | 0.7940 | −0.5801 + j0.1818 |
|  | −0.5801 + j0.1818 | −0.7940 |
| 010 | 0.7940 | 0.0579 − j0.6051 |
|  | −0.0579 + j0.6051 | −0.7940 |
| 011 | 0.7941 | −0.2978 + j0.5298 |
|  | −0.2978 − j0.5298 | −0.7941 |
| 100 | 0.7941 | 0.6038 − j0.0689 |
|  | 0.6038 + j0.0689 | −0.7941 |
| 101 | 0.3289 | 0.6614 − j0.6740 |
|  | 0.6614 + j0.6740 | −0.3289 |
| 110 | 0.5112 | 0.4754 + j0.7160 |
|  | 0.4754 − j0.7160 | −0.5112 |
| 111 | 0.3289 | −0.8779 − j0.3481 |
|  | −0.8779 − j0.3481 | −0.3289 |

The above-mentioned MIMO schemes are requisite for a wireless mobile communication system capable of providing a high transfer rate and a high reliability in a limited frequency band. The above-mentioned MIMO schemes have different performances according to a variety of factors, i.e., a UE (User Equipment) speed, a channel situation, and the number of multi-antennas, such that schemes of different structures must be applied according to channel conditions, resulting in an increase of system complexity and costs.

As can be seen from Table 1, the space-time code (STC) has different codes according to individual antenna structures, and symbols are repeatedly transmitted during several timeslots to get a spatial diversity gain. As a result, the space-time code has a disadvantage in that it unavoidably increases the complexity of the transmission/reception end. Also, the above-mentioned MIMO schemes transmit signals without using feedback information, such that a closed-loop system has a performance less than those of other MIMO schemes using feedback information.

The CDD scheme has a spatial multiplexing rate of 1, such that it is unable to expect the high data transfer date. If resources are fixedly allocated, the CDD scheme has difficulty in acquiring the above gain.

A stable channel is needed for a feedback in a codebook-based precoding scheme because a channel for a UE changes if the UE speed increases. Therefore, the codebook-based precoding scheme is improper for a mobile environment of an abrupt channel variation. Specifically, the codebook-based precoding scheme can be applied to only the closed-loop system.

When the conventional codebook-based precoding scheme is used, uplink transfer rate decreases because each UE needs to feed back codebook index compared with the above-mentioned two MIMO schemes. Also, when the conventional codebook-based precoding scheme is used, the required memory capacity increases and the system complexity increases because each of the transmission/reception ends needs to have a codebook, and because different codebooks are required according to the number of Tx antennas and the special multiplexing rate.

DISCLOSURE

Technical Problem

Accordingly, the present invention is directed to a method for transmitting/receiving data in a multi-carrier Multiple-Input Multiple-Output (MIMO) system that substantially obviates one or more problems due to limitations and disadvantages of the related art.

An object of the present invention is to provide a phase-shift-based precoding scheme which is capable of solving the problems of the conventional Cyclic Delay Diversity (CDD) scheme, Phase Shift Diversity (PSD) scheme, and precoding scheme, and to applying a phase-shift-based precoding schemes in various manners by generalizing or extending a phase-shift-based precoding matrix.

Technical Solution

To achieve these objects and other advantages and in accordance with the purpose of the invention, as embodied and broadly described herein, a data transmission method for a Multiple-Input Multiple-Output (MIMO) system employing several sub-carriers (i.e., multi-carrier) comprising: determining a precoding matrix to be some parts of a phase-shift-based precoding matrix; determining a first diagonal matrix for phase shift to be some parts of the phase-shift-based precoding matrix; determining a unitary matrix to be some parts of the phase-shift-based precoding matrix; precoding a transmission symbol for each resource using the phase-shift-based precoding matrix; and transmitting the precoded data, wherein the phase-shift-based precoding matrix is determined by the product of the precoding matrix, a Hermitian matrix of the unitary matrix, the first diagonal matrix, and the unitary matrix.

In another aspect of the present invention, there is provided a data reception method for a Multiple-Input Multiple-Output (MIMO) system employing several sub-carriers (i.e., multi-carrier) comprising: determining a precoding matrix to be some parts of a phase-shift-based precoding matrix; determining a first diagonal matrix for phase shift to be some parts of the phase-shift-based precoding matrix; determining a unitary matrix to be some parts of the phase-shift-based precoding matrix; and decoding a corresponding sub-carrier symbol on the basis of the phase-shift-based precoding matrix composed of a product of the precoding matrix, a Hermitian matrix of the unitary matrix, the first diagonal matrix, and the unitary matrix.

Preferably, the data transmission method further comprises: determining a second diagonal matrix for phase shift to be some parts of the phase-shift-based precoding matrix, wherein the phase-shift-based precoding matrix is determined by the product of the precoding matrix, the Hermitian matrix of the unitary matrix, the first diagonal matrix, and the unitary matrix.

Preferably, the first diagonal matrix and the second diagonal matrix use phase-shift phase values independent of each other.

Preferably, the data transmission method further comprises: controlling whether to use each of the first diagonal matrix and the second diagonal matrix according to the phase-shift phase value.

Preferably, the product of the Hermitian matrix, the first diagonal matrix, and the unitary matrix is determined according to a spatial multiplexing rate R.

Preferably, the rotation matrix is changed according to a resource index (k).

Preferably, the rotation matrix is changed according to a resource index (k), and the same rotation matrix is applied to consecutive resources of a predetermined number '1'.

Preferably, the rotation matrix includes a switching factor, such that the switching factor can determine whether to use the rotation matrix according to configuration information.

In another aspect of the present invention, there is provided a data transmission method for a Multiple-Input Multiple-Output (MIMO) system employing several sub-carriers (i.e., multi-carrier) comprising: determining a precoding matrix to be some parts of a phase-shift-based precoding matrix; determining a rotation matrix decided by a spatial multiplexing rate to be some parts of the phase-shift-based precoding matrix; precoding a transmission symbol for each resource using the phase-shift-based precoding matrix denoted by a product of the precoding matrix and the rotation matrix; and transmitting the precoded data.

In another aspect of the present invention, there is provided a data reception method for a Multiple-Input Multiple-Output (MIMO) system employing several sub-carriers (i.e., multi-carrier) comprising: determining a precoding matrix to be some parts of a phase-shift-based precoding matrix; determining a rotation matrix decided by a spatial multiplexing rate to be some parts of the phase-shift-based precoding matrix; decoding a corresponding sub-carrier symbol on the basis of the phase-shift-based precoding matrix composed of a product of the precoding matrix and the rotation matrix.

Preferably, the rotation matrix is changed according to a resource index (k).

Preferably, the rotation matrix is changed according to a resource index (k), and the same rotation matrix is applied to consecutive resources of a predetermined number '1'.

Preferably, the rotation matrix includes a switching factor, such that the switching factor can determine whether to use the rotation matrix according to configuration information.

It is to be understood that both the foregoing general description and the following detailed description of the present invention are exemplary and explanatory and are intended to provide further explanation of the invention as claimed.

Advantageous Effects

Therefore, since the phase-shift-based precoding scheme solves the problems of CDD scheme, PSD scheme, and precoding scheme by the present invention, communications can effectively be established. Specifically, the present invention generalizes or extends a phase-shift-based precoding scheme, such that the transmission/reception end can be designed easily and the communication efficiency can be increased.

The present invention can change a flat-fading channel to a frequency-selective channel according to the phase shift diversity scheme using the phase-shift-based precoding matrix. The present invention may acquire a frequency diversity gain by channel coding, or may acquire a multi-user diversity gain by frequency selective scheduling.

The present invention may additionally apply the Hermitian matrix of a unitary matrix or a rotation matrix to a phase-shift-based precoding matrix, such that it reduces the complexity of the reception end but increases a decoding gain of the reception end.

DESCRIPTION OF DRAWINGS

The accompanying drawings, which are included to provide a further understanding of the invention, illustrate embodiments of the invention and together with the description serve to explain the principle of the invention.

In the drawings.

MODE FOR INVENTION

Reference will now be made in detail to the preferred embodiments of the present invention, examples of which are illustrated in the accompanying drawings. Wherever possible, the same reference numbers will be used throughout the drawings to refer to the same or like parts.

For the convenience of description and better understanding of the present invention, general structures and devices well known in the art will be omitted or be denoted by a block diagram or a flow chart. Wherever possible, the same reference numbers will be used throughout the drawings to refer to the same or like parts.

Embodiment 1

Phase-Shift-Based Precoding Matrix

Figure 5:
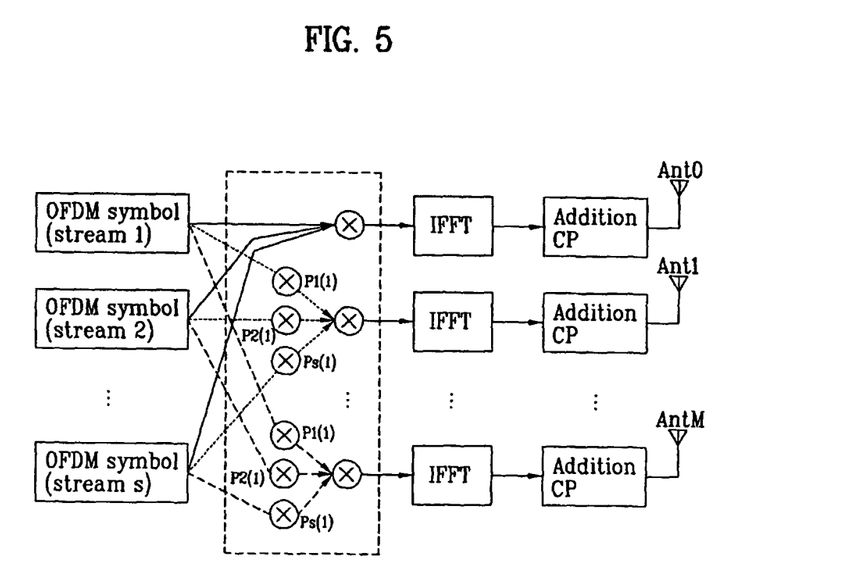
FIG. 5 is a block diagram illustrating the principal components of a transmission/reception end of the phase-shift-based precoding according to the present invention.

FIG. 5 is a block diagram illustrating the principal components of a transmission/reception end of the phase-shift-based precoding according to the present invention.

Referring to FIG. 5, the phase-shift-based precoding method transmits all streams to be transmitted via all antennas, multiplies the Tx streams by sequences of different phases, and transmits the multiplied result. Generally, if a phase sequence generated by a small cyclic delay value is used, the frequency selectivity in a channel occurs in the receiver, and the channel capacity increases or decreases according to frequency bands. In other words, the transmitter can select a specific part having good channel quality among frequency bands fluctuating by a relatively small cyclic delay value, and than allocate the selected part to a user equipment (UE) to get scheduling gain.

In this case, the present invention may use the phase-shift-based precoding matrix to apply a cyclic delay value, which regularly increases or decreases, to each antenna. The following equation 1 shows the phase-shift-based precoding matrix P:

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$ [Equation 1]

In Equation 1, k is indicative of a resource index. For example, k is indicative of a sub-carrier index or an index of a specific frequency band. $w_{i,j}^k$ (i=1, ..., $N_t$, j=1, ..., R) is indicative of a complex weight factor decided by the resource index k. $N_t$ is indicative of the number of Tx antennas, and R is indicative of a spatial multiplexing rate. In this case, the complex weight factor may have different values according to both an OFDM symbol multiplied by the antenna and a corresponding sub-carrier index. The complex weight factor may be decided by at least one of the presence or absence of a channel condition and feedback information.

In the meantime, a channel capacity of a MIMO open-loop system can be represented by the following equation 2:

$$C_u(H) = \log_2\left(\det\left(I_{N_r} + \frac{SNR}{N}HH^H\right)\right)$$ [Equation 2]

In Equation 2, H is indicative of ($N_r \times N_t$)-sized MIMO channel matrix, $I_{N_r}$ is indicative of a ($N_r \times N_r$)-sized unitary matrix (also called "($N_r \times N_r$)-sized identity matrix"), and $N_r$ is indicative of the number of Rx antennas. If the precoding matrix P is applied to Equation 2, the following equation 3 can be acquired.

$$C_{precoding}(H) = \log_2\left(\det\left(I_{N_r} + \frac{SNR}{N}HPP^HH^H\right)\right)$$ [Equation 3]

As can be seen from Equation 3, if $PP^H$ is a unitary matrix (i.e., an identity matrix) shown in the following equation 4, there is no loss of the channel capacity.

$$PP^H = I_{N_t}$$ [Equation 4]

As can be seen from Equation 4, $PP^H$ may have a unitary matrix (i.e., an identity matrix). In other words, if the phase-shift-based precoding matrix P of the above Equation 1 satisfies constituent conditions of the unitary matrix, the loss of the channel capacity of the MIMO system may be reduced.

For example, if the phase-shift-based precoding matrix P simultaneously satisfies the following two conditions (i.e., a power restriction criteria and an orthogonality matrix criteria), this situation may be considered that the identity matrix criteria has been satisfied. The power restriction criteria allows each column of the matrix to have the size of 1. The orthogonality restriction criteria has orthogonality between individual columns of the matrix.

The phase-shift-based precoding matrix P for satisfying the above-mentioned identity matrix criteria can be implemented with the combination of several unitary matrixes. Next, a variety of phase-shift-based precoding matrixes P will hereinafter be described.

Embodiment 2

Phase-Shift-Based Precoding Matrix According to Generalized Phase Shift Diversity Scheme If the number of antennas is $N_t$ (where $N_t$ is a natural number of at least 2) and the spatial multiplexing rate is R, the phase-shift-based precoding matrix can be represented by the following equation 5. The phase-shift-based precoding matrix of Equation 5 is represented by the generalized format of the conventional phase shift diversity scheme. The MIMO scheme of Equation 5 may also be referred to as a generalized phase shift diversity (GPSD) scheme.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$

$$= \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{pmatrix}(U^k_{N_t \times R})$$ [Equation 5]

As can be seen from Equation 5, the phase-shift-based precoding matrix is implemented by the product of a phase shift diagonal matrix including the resource index k and a unitary matrix.

In this case, $P_{N_t \times R}^k$ is indicative of a phase-shift-based precoding matrix of the k-th sub-carrier of the MIMO-OFDM signal having $N_t$ number of Tx antennas and the spatial multiplexing rate of R. $U_{N_t \times R}^k$ is indicative of a unitary matrix which satisfies the condition of Equation 4, and can maximize the interference between sub-carrier symbols corresponding to each antenna. $U_{N_t \times R}^k$ may satisfy the condition of the unitary matrix, such that the unitary matrix characteristics of the phase-shift diagonal matrix (D) can be maintained. The relationship between a phase angle ($\theta_i$, i=1, ..., $N_t$) of the frequency domain and a delay time ($\tau_i$, i=1, ..., $N_t$) of the time domain can be represented by the following equation 6:

$$\theta_i = \frac{-2\pi}{N_{fft}} \cdot \tau_i \qquad [\text{Equation 6}]$$

In Equation 6, $N_{fft}$ is indicative of the number of sub-carriers of the OFDM signal.

As a modified example of Equation 5, the phase-shift-based precoding matrix of the following equation 7 can be constructed.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} \qquad [\text{Equation 7}]$$

$$= (U^k_{N_t \times R}) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix}$$

If a phase-shift-based precoding matrix is constructed by Equation 7, the matrix can be easily constructed because symbols of each data stream (or OFDM sub-carrier) are shifted by the same phase. In other words, individual sub-carrier symbols are shifted by the same phase because the phase-shift-based precoding matrix of Equation 7 has columns having the same phase, whereas the phase-shift-based precoding matrix of Equation 5 has rows having the same phase.

As an example of the unitary matrix of Equation 5 or 7, a predetermined matrix for acquiring a SNR gain may be used. A Walsh Hadamard matrix or a Discrete Fourier Transform (DFT) matrix may be used as the above predetermined matrix. For example, if the Walsh Hadamard matrix is used as the above predetermined matrix, the phase-shift-based precoding matrix of Equation 5 can be represented by the following equation 8.

$$P^k_{4 \times 4} = \frac{1}{2} \begin{pmatrix} e^{j\theta_1 k} & 0 & 0 & 0 \\ 0 & e^{j\theta_2 k} & 0 & 0 \\ 0 & 0 & e^{j\theta_3 k} & 0 \\ 0 & 0 & 0 & e^{j\theta_4 k} \end{pmatrix} \begin{pmatrix} 1 & 1 & 1 & 1 \\ 1 & -1 & 1 & -1 \\ 1 & 1 & -1 & -1 \\ 1 & -1 & -1 & 1 \end{pmatrix} \qquad [\text{Equation 8}]$$

Equation 8 shows the (4×4)-sized Walsh Hadamard matrix of the system, which has four Tx antennas and the spatial multiplexing rate of 4. If a (2×2) or (4×4)-sized Walsh Hadamard matrix is used as the unitary matrix, the phase-shift-based precoding matrix can be represented by the following tables 3 and 4:

TABLE 3

| 2 Tx | |
|---|---|
| Rate 1 | Rate 2 |
| $\frac{1}{\sqrt{2}}\begin{bmatrix} 1 \\ e^{j\theta_1 k} \end{bmatrix}$ | $\frac{1}{\sqrt{2}}\begin{bmatrix} 1 & 1 \\ e^{j\theta_1 k} & e^{j\theta_1 k} \end{bmatrix}$ |

TABLE 4

| 4 Tx | | |
|---|---|---|
| Rate 1 | Rate 2 | Rate 4 |
| $\frac{1}{2}\begin{bmatrix} 1 \\ e^{j\theta_1 k} \\ e^{j\theta_2 k} \\ e^{j\theta_3 k} \end{bmatrix}$ | $\frac{1}{2}\begin{bmatrix} 1 & 1 \\ e^{j\theta_1 k} & -e^{j\theta_1 k} \\ e^{j\theta_2 k} & e^{j\theta_2 k} \\ e^{j\theta_3 k} & -e^{j\theta_3 k} \end{bmatrix}$ | $\frac{1}{2}\begin{bmatrix} 1 & 1 & 1 & 1 \\ e^{j\theta_1 k} & -e^{j\theta_1 k} & e^{j\theta_1 k} & -e^{j\theta_1 k} \\ e^{j\theta_2 k} & e^{j\theta_2 k} & -e^{j\theta_2 k} & -e^{j\theta_2 k} \\ e^{j\theta_3 k} & -e^{j\theta_3 k} & -e^{j\theta_3 k} & e^{j\theta_3 k} \end{bmatrix}$ |

However, it is preferable that the phase-shift-based precoding matrix be set to a fixed matrix in an open-loop system. An exemplary unitary matrix of a (R×R) DFT (Discrete Fourier Transform) matrix fixed in all the frequency bands can be represented by the following equation 9:

$$U_{R \times R} = e^{-j\frac{2\pi nm}{R}} \qquad [\text{Equation 9}]$$

In Equation 9, n (n=0, 1, ..., R−1) is indicative of a row index of the unitary matrix, and m (m=0, 1, ..., R−1) is indicative of a column index of the unitary matrix. If required, the DFT matrix may be reconstructed to have a frequency factor k, such that individual frequency bands may use different unitary matrixes.

In the meantime, the unitary matrix of Equation 5 or 7 may be constructed in the form of a codebook, and then the codebook-format unitary matrix can be provided to the transmission end and the reception end. In this case, the transmission end receives feedback information of the codebook index information from the reception end, and selects the unitary matrix of a corresponding index from its own codebook, and then it may construct the phase-shift-based precoding matrix using one of Equations 5 and 7. If the unitary matrix is properly reconstructed, a specific Tx antenna may be selected (i.e., antenna selection) or the spatial multiplexing rate may be tuned (i.e., spatial multiplexing rate tuning).

Embodiment 3

Extended-Diagonal Matrix Addition of Phase-Shift-Based Precoding Matrix

If Equation 5 or 7 is extended, the phase-shift-based precoding matrix of the following equation 10 can be constructed.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix} \qquad [\text{Equation 10}]$$

-continued $$= D_1(U_{N_t \times R}^k)D_2$$

$$= \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{pmatrix}$$

$$(U_{N_t \times R}^k) \begin{pmatrix} e^{j\theta'_1 k} & 0 & \cdots & 0 \\ 0 & e^{j\theta'_2 k} & \cdots & 0 \\ \vdots & \vdots & \ddots & \vdots \\ 0 & 0 & \cdots & e^{j\theta'_R k} \end{pmatrix}$$

Compared with Equation 5, Equation 10 includes a first diagonal matrix D1 and a second diagonal matrix D2. In this case, each row and each column of the phase-shift-based precoding matrix have independent phases, resulting in the implementation of a variety of frequency diversity gains.

Figure 6:
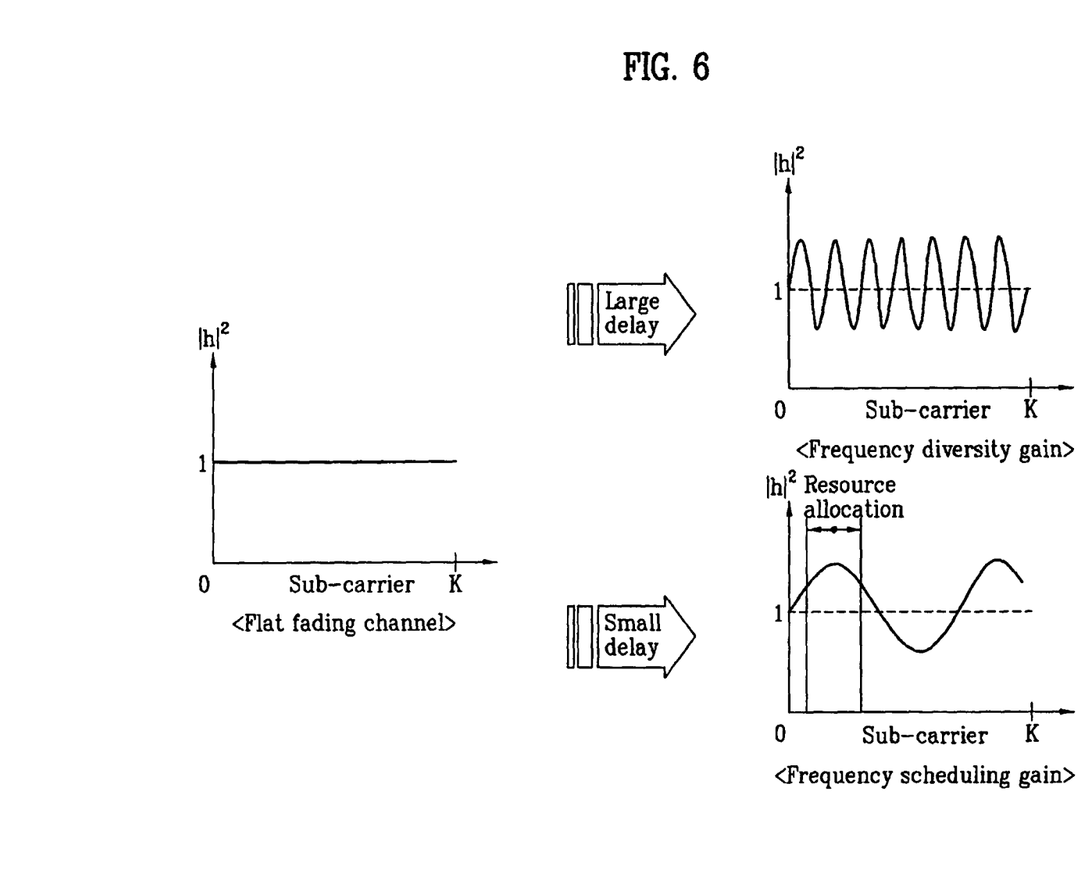
FIG. 6 graphically shows two examples of the phase-shift-based precoding method according to the size of a delay sample.

FIG. 6 graphically shows two examples of the phase-shift-based precoding method according to the size of a delay sample.

As can be seen from FIG. 6, in the case of using a large sample delay value (or a cyclic delay value), a frequency-based channel status variation time becomes reduced, and the possibility of the frequency selectivity becomes increased. As a result, the channel code may acquire a frequency diversity gain. These examples are preferably for an open-loop system with a low reliability of feedback information due to excessive time channel variation.

In the case of using a small sample delay value, the flat-fading channel is changed to the frequency-selective channel, and the channel capacity of a part of the channel increases and the channel capacity of some of the other part of the channel decrease. Therefore, in the sub-carrier area of the OFDM signal, the size of the channel capacity gradually increases in some sub-carrier areas, and gradually decreases in other sub-carrier areas.

In this case, provided that the OFDMA (Orthogonal Frequency Division Multiple Access) system for providing several users with necessary services transmits signals to each user via a predetermined frequency band having the increased channel capacity, the Signal-to-Noise Ratio (SNR) can be increased. Also, individual users may frequently have different frequency bands having the increased channel capacity, such that the system can acquire a multi-user diversity scheduling gain. In the meantime, because the reception end needs to feed back only the channel quality indicator (CQI) of the sub-carrier area to which resources can be allocated, the amount of feedback information is relatively decreased.

The phase-shift-based precoding sample delay (or the phase-shift-based precoding cyclic delay) may be prescribed in the transmission/reception end, or may be set to a specific value which may be fed back from the receiver to the transmitter. Also, the spatial multiplexing rate R may also be prescribed in the transmission/reception end. However, the receiver periodically recognizes the channel status, calculates the spatial multiplexing rate, and feeds back the calculated spatial multiplexing rate to the transmitter. Otherwise, the transmitter may calculate or change the spatial multiplexing rate using the feedback channel information received from the receiver.

In the case of using two phase-shift diagonal matrixes shown in Equation 9, the sample delay applied to the phase-shift-based precoding is represented by a phase angle of each diagonal matrix. The frequency diversity gain or the frequency scheduling gain may be acquired according to the phase angle.

In this case, a phase angle of a single system can be simultaneously shifted by two values according to the first and second diagonal matrixes D1 and D2. For example, if a low phase shift value is used by the first diagonal matrix D1 in a first case and a high phase shift value is used by the second diagonal matrix D2 in a second case, the multi-user diversity scheduling gain can be acquired by the first case, and the frequency diversity gain can be acquired by the second case.

In this case, the first diagonal matrix D1 is used to increase the system performance, and the second diagonal matrix D2 is used to perform averaging of a channel between streams. Also, the first diagonal matrix D1 and a high phase shift value may be used, such that the frequency diversity gain increases. The second diagonal matrix D2 and a high phase shift value may be used, such that a channel between streams is averaged and the averaged result is used.

In Equation 10, a phase angle $\theta_i$ of the first diagonal matrix and a phase angle $\theta_j$ of the second diagonal matrix can be adaptively used in four types shown in the following table 5, or the four types can be used according to a base station (BS) or a user equipment (UE).

TABLE 5

| Delay Sample Option | Phase angle $\theta_i$ of first diagonal matrix | Phase angle $\theta_j$ of first diagonal matrix |
|---|---|---|
| 1 | $\theta_i = 0$ | $\theta_j = 0$ |
| 2 | $\theta_i = \psi_i$ | $\theta_j = 0$ |
| 3 | $\theta_i = 0$ | $\theta_j = \psi_j$ |
| 4 | $\theta_i = \psi_i$ | $\theta_j = \psi_j^2$ |

In Equation 10, $\psi$ is indicative of a phase angle decided by a specific sample delay, and may have different values according to two phase-shift matrixes. If the phase angle is set to '0', this indicates that no diagonal matrix is used. In other words, a sample delay value (i.e., a phase angle) is adjusted, such that the adjusted sample delay value can control whether to use each diagonal matrix.

Embodiment 4

Extended-Diagonal Matrix Addition of Phase-Shift-Based Precoding Matrix

If an additional precoding matrix has been added to the phase-shift-based precoding matrix composed of the diagonal matrix D and the unitary matrix U in the above second embodiment, the extended phase-shift-based precoding matrix shown in the following equation 11 can be constructed.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix} \quad \text{[Equation 11]}$$

$$= (W_{N_t \times R}^k)(D_{R \times R}^k)(U_{R \times R}^k)$$

$$= (W_{N_t \times R}^k) \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (U_{R \times R}^k)$$

In the case of the extended phase-shift-based precoding matrix of Equation 11, the ($N_t \times R$)-sized precoding matrix W is added to the front of the diagonal matrix D as compared to Equation 5, such that each of the size of the diagonal matrix D and the size of the unitary matrix U is changed to ($R \times R$).

The added precoding matrix W and the unitary matrix U may be differently established in a specific frequency band or a specific sub-carrier symbol. By the addition of the precoding matrix W, the optimum SNR is implemented.

The transmission end or the reception end includes the codebook including several precoding matrixes, and the added precoding matrix W is selected from the above-mentioned codebook and the selected precoding matrix W is then used.

The above-mentioned embodiment in which two phase-shift diagonal matrixes of Equation 10 are used may also be extended according to this embodiment. Other examples of the extended phase-shift-based precoding matrix are shown in the following equation 12:

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ [Equation 12]

$$= D_1(W_{N_t \times R}^k) D_2(U_{N_t \times R}^k)$$

$$= \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{pmatrix} (W_{N_t \times R}^k)$$

$$\begin{pmatrix} e^{j\theta'_1 k} & 0 & \cdots & 0 \\ 0 & e^{j\theta'_2 k} & \cdots & 0 \\ \vdots & \vdots & \ddots & \vdots \\ 0 & 0 & \cdots & e^{j\theta'_R k} \end{pmatrix} (U_{R \times R}^k)$$

In the case of the extended phase-shift-based precoding matrix of Equation 12, the ($N_t \times N_t$)-sized first diagonal matrix D1 and the ($N_t \times R$)-sized precoding matrix W are added to the front of the second diagonal matrix D2 as compared to Equation 5, such that the size of the second diagonal matrix D2 is changed to ($R \times R$).

In this case, as described above, the precoding matrix W and the unitary matrix U may be differently established in a specific frequency band or a specific sub-carrier symbol. Preferably, a fixed matrix may be established in the open-loop system. For example, the DFT matrix of Equation 9 may be used.

Embodiment 5

Hermitian Matrix Addition of Extended-Unitary Matrix of Phase-Shift-Based Precoding Matrix The Hermitian matrix of the unitary matrix is added to the phase-shift-based precoding matrix composed of the precoding matrix W, the diagonal matrix D, and the unitary matrix U of the above-mentioned embodiment 5, such that the extended phase-shift-based precoding matrix shown in the following equation 13 can be constructed.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ [Equation 13]

$$= (W_{N_t \times R}^k)(U_{R \times R}^k)^H (D_{R \times R}^k)(U_{R \times R}^k)$$

$$= (W_{N_t \times R}^k)(U_{R \times R}^k)^H$$

$$\begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (U_{R \times R}^k)$$

In Equation 13, $(U_{R \times R}^k)^H$ is indicative of the Hermitian matrix of the unitary matrix U. The precoding matrix W or the unitary matrix U may be set to a specific matrix appropriate for each sub-carrier k. Otherwise, the precoding matrix W or the unitary matrix U may be set to a fixed matrix in all the frequency bands. If the above unitary matrix U is independently applied to the sub-carrier k, the DFT matrix of Equation 9 may be used as an example.

As shown in Equation 13, provided that the Hermitian matrix of the unitary matrix is additionally used as denoted by ($U^H$), and a specific phase angle is applied to the diagonal matrix D, the product of the Hermitian matrix ($U^H$), the diagonal matrix D, and the unitary matrix U results in a very simple format. In this case, the Hermitian matrix ($U^H$) acts as the unitary matrix other than the precoding matrix W. By the addition of the Hermitian matrix, the reception end decodes data without modifying the precoding matrix W, such that it reduces the complexity of the reception end and acquires the decoding gain.

The embodiment of using two phase-shift diagonal matrixes of Equation 10 can be extended according to this embodiment. Another example of the extended phase-shift-based precoding matrix is shown in the following equation 14.

$$P_{N_t \times R}^k = \begin{pmatrix} w_{1,1}^k & w_{1,2}^k & \cdots & w_{1,R}^k \\ w_{2,1}^k & w_{2,2}^k & \cdots & w_{2,R}^k \\ \vdots & \vdots & \ddots & \vdots \\ w_{N_t,1}^k & w_{N_t,2}^k & \cdots & w_{N_t,R}^k \end{pmatrix}$$ [Equation 14]

$$= D_1(W_{N_t \times R}^k)(U_{R \times R}^k)^H D_2(U_{N_t \times R}^k)$$

$$= \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_{N_t} k} \end{pmatrix}$$

$$(W_{N_t \times R}^k)(U_{R \times R}^k)^H$$

-continued $$\begin{pmatrix} e^{j\theta'_1 k} & 0 & \cdots & 0 \\ 0 & e^{j\theta'_2 k} & \cdots & 0 \\ \vdots & \vdots & \ddots & \vdots \\ 0 & 0 & \cdots & e^{j\theta'_R k} \end{pmatrix} (U^k_{R \times R})$$

In Equation 14, $(U_{R \times R}^k)^H$ is indicative of the Hermitian matrix of the unitary matrix U. In the same manner as in Equation 10, a phase angle $\theta_i$ of the first diagonal matrix and the other phase angle $\theta_j$ of the second diagonal matrix can be adaptively used in four types shown in the following table 5, or the four types can be used according to a base station (BS) or a user equipment (UE). In other words, the sample delay value (i.e., the phase angle) is adjusted, such that the adjusted sample delay value can control whether to use each diagonal matrix.

Embodiment 6

Extended-Rotation Matrix Use of Phase-Shift-Based Precoding Matrix

Equation 13 can be represented by the following equation 15.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$

$$= (W^k_{N_t \times R})(\Phi^k_{R \times R})$$

[Equation 15]

In Equation 15, $\Phi_{R \times R}^k$ is indicative of a rotation matrix. The rotation matrix $\Phi_{R \times R}^k$ of Equation 15 is represented by the product of the Hermitian matrix $(U^H)$ of the unitary matrix, the diagonal matrix (D), and the unitary matrix (U). Needless to say, the method of using the rotation matrix can also be applied to Equation 14 illustrating the embodiment of two diagonal matrixes, as represented by the following equation 16.

$$P^k_{N_t \times R} = \begin{pmatrix} w^k_{1,1} & w^k_{1,2} & \cdots & w^k_{1,R} \\ w^k_{2,1} & w^k_{2,2} & \cdots & w^k_{2,R} \\ \vdots & \vdots & \ddots & \vdots \\ w^k_{N_t,1} & w^k_{N_t,2} & \cdots & w^k_{N_t,R} \end{pmatrix}$$

$$= \begin{pmatrix} e^{j\theta_1 k} & 0 & \cdots & 0 \\ 0 & e^{j\theta_2 k} & \cdots & 0 \\ \vdots & \vdots & \ddots & \vdots \\ 0 & 0 & \cdots & e^{j\theta_R k} \end{pmatrix} (W^k_{N_t \times R})(\Phi^k_{R \times R})$$

[Equation 16]

As a rotation matrix R of Equation 15 or 16, the rotation matrix for each resource index may be used according to the spatial multiplexing rate as shown in the following table 6.

TABLE 6

| Spatial multiplexing rate | Rotation matrix |
| --- | --- |
| Spatial multiplexing rate 2 | $\Phi^k_{2 \times 2} = \begin{pmatrix} 0 & 1 \\ 1 & 0 \end{pmatrix}^k$ |
| Spatial multiplexing rate 3 | $\Phi^k_{3 \times 3} = \begin{pmatrix} 0 & 1 & 0 \\ 0 & 0 & 1 \\ 1 & 0 & 0 \end{pmatrix}^k$ |
| Spatial multiplexing rate 4 | $\Phi^k_{4 \times 4} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^k$ |

Table 6 shows exemplary rotation matrixes under the spatial multiplexing rates of 2, 3, and 4. As can be seen from individual rotation matrixes of Table 6, 'k' is indicative of an index allocated to each resource. In this case, the resource may be a virtual resource or sub-carrier available for the scheduling.

As can be seen from the individual rotation matrixes of Table 1, as the 'k' value is changed in the order of 1, 2, ..., the selected streams for individual streams are rotated in different matrixes. For example, if the spatial multiplexing rate is 2, as the 'k' value is changed in the order of 1, 2, ..., two rotation matrixes $$\begin{pmatrix} 0 & 1 \\ 1 & 0 \end{pmatrix} \text{ and } \begin{pmatrix} 1 & 0 \\ 0 & 1 \end{pmatrix}$$

are sequentially rotated. Namely, if the rotation matrix is multiplied by the codeword, a stream to which each codeword for each resource belongs is rotated. In Table 6, if the spatial multiplexing rate is 3, three matrixes can be sequentially rotated and used. If the spatial multiplexing rate is 4, four matrixes can be sequentially rotated and used.

The above-mentioned rotation matrix illustrates an exemplary rotation matrix which is changed according to the resource index 'k'. In order to use the same index during a predetermined interval according to individual situations, the following rotation matrix of Table 7 can be used.

TABLE 7

| Spatial multiplexing rate | Rotation matrix |
| --- | --- |
| Spatial multiplexing rate 2 | $\Phi^k_{2 \times 2} = \begin{pmatrix} 0 & 1 \\ 1 & 0 \end{pmatrix}^{\lfloor \frac{k}{i} \rfloor}$ |
| Spatial multiplexing rate 3 | $\Phi^k_{3 \times 3} = \begin{pmatrix} 0 & 1 & 0 \\ 0 & 0 & 1 \\ 1 & 0 & 0 \end{pmatrix}^{\lfloor \frac{k}{i} \rfloor}$ |
| Spatial multiplexing rate 4 | $\Phi^k_{4 \times 4} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{\lfloor \frac{k}{i} \rfloor}$ |

With reference to individual rotation matrixes of Table 2, 'k' is indicative of an index allocated to each resource. In this case, the resource may be a virtual resource or sub-carrier available for the scheduling. In Table 2, 'l' is indicative of a rotation length factor which is able to establish a predetermined interval in which the same index (i.e., the same rotation matrix) is used. In this case, 'l' may be changed in different ways according to channel situations. For example, 'l' may be set to the spatial multiplexing rate 'R', as denoted by l=R.

In addition, if there is no rotation in each rotation matrix of Tables 6 and 7, 'k' is set to '0' so that no rotation occurs. This relationship can be represented by the following equation 17.

$$\text{rotation} \begin{cases} \text{on}, & k = \text{subcarrier index} \\ \text{off}, & k = 0 \end{cases} \quad [\text{Equation 17}]$$

A switching factor may be added to the rotation matrix and be then used, such that the same method as that of Equation 17 can be switched on or off according to individual situations. This relationship can be represented by the following Table 8.

TABLE 8

| Spatial multiplexing rate | Rotation matrix |
|---|---|
| Spatial multiplexing rate 2 | $\Phi^k_{2\times 2} = \begin{pmatrix} 0 & 1 \\ 1 & 0 \end{pmatrix}^{k\delta}$ |
| Spatial multiplexing rate 3 | $\Phi^k_{3\times 3} = \begin{pmatrix} 0 & 1 & 0 \\ 0 & 0 & 1 \\ 1 & 0 & 0 \end{pmatrix}^{k\delta}$ |
| Spatial multiplexing rate 4 | $\Phi^k_{4\times 4} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{k\delta}$ |

With reference to Table 8, the switching factor ($\delta$) is additionally applied to the rotation matrix of Table 6, such that there is provided a method for controlling whether to use the rotation matrix according to the switching factor ($\delta$). In this case, the switching factor ($\delta$) for determining whether to use the rotation matrix can be represented by the following equation 18.

$$\delta \begin{cases} 1 : \text{on} \\ 0 : \text{off} \end{cases} \quad [\text{Equation 18}]$$

The above-mentioned method for additionally employing the switching factor ($\delta$) may also be applied to the above-mentioned method in which the same index is used during a predetermined interval according to the above situations shown in Table 7. This relationship can be represented by the following table 9.

TABLE 9

| Spatial multiplexing rate | Rotation matrix |
|---|---|
| Spatial multiplexing rate 2 | $\Phi^k_{2\times 2} = \begin{pmatrix} 0 & 1 \\ 1 & 0 \end{pmatrix}^{\lfloor \frac{k}{l} \rfloor \delta}$ |

TABLE 9-continued

| Spatial multiplexing rate | Rotation matrix |
|---|---|
| Spatial multiplexing rate 3 | $\Phi^k_{3\times 3} = \begin{pmatrix} 0 & 1 & 0 \\ 0 & 0 & 1 \\ 1 & 0 & 0 \end{pmatrix}^{\lfloor \frac{k}{l} \rfloor \delta}$ |
| Spatial multiplexing rate 4 | $\Phi^k_{4\times 4} = \begin{pmatrix} 0 & 1 & 0 & 0 \\ 0 & 0 & 1 & 0 \\ 0 & 0 & 0 & 1 \\ 1 & 0 & 0 & 0 \end{pmatrix}^{\lfloor \frac{k}{l} \rfloor \delta}$ |

If the rotation matrix is applied to the phase-shift-based precoding matrix as described above, the complexity can be reduced. Specifically, a decoding gain can be increased because the precoding matrix W may be applied to the reception end without any change. As described above, by adding a simple factor, it can be determined whether a predetermined interval will be repeatedly used or not.

In the meantime, at least one of the precoding matrix W, the phase angle $\theta$ of the diagonal matrix, and the unitary matrix U from among the phase-shift-based precoding matrixes can be changed to another in time. For this operation, if the index of the next precoding matrix W is fed back in units of a predetermined time or a predetermined sub-carrier, a specific precoding matrix W corresponding to the above index can be selected from a predetermined codebook.

The extended phase-shift-based precoding matrix can be represented by the following equation 19:

$$P^k_{N_t \times R}(t) = \quad [\text{Equation 19}]$$

$$(W^k_{N_t \times R}(t)) \begin{pmatrix} e^{j\theta_1(t)k} & 0 & \cdots & 0 \\ 0 & e^{j\theta_2(t)k} & \cdots & 0 \\ \vdots & \vdots & \ddots & \vdots \\ 0 & 0 & \cdots & e^{j\theta_R(t)k} \end{pmatrix} (U^k_{R \times R}(t))$$

The reception end, which receives data precoded by the phase-shift-based precoding matrix, inversely tracks the phase-shift-based precoding matrix, such that it can decode original data of the transmission end. Generally, individual components of the receiver perform inverse functions of those of the transmitter, and detailed description thereof will hereinafter be described in detail.

The receiver according to the present invention may acquire MIMO channel information of a corresponding sub-carrier via which data is transmitted using pilot symbols for channel estimation, and may acquire equivalent channel information using this MIMO channel information and the phase-shift-based precoding matrix. The phase-shift-based precoding matrix may be represented by the product of the precoding matrix, the diagonal matrix, and the unitary matrix. The phase-shift-based precoding matrix may be decided by control information (e.g., precoding-matrix information or rank information) received from the transmission end.

The present invention extracts the phase-shift-based precoded Tx signal acquired from several MIMO receivers using the acquired equivalent channel information and the signal vector. Upon receiving the extracted signal, the receiver performs the channel decoding, and performs error detection or error correction, such that it finally acquires Tx data.

The above-mentioned process may be repeatedly used or may include an additional decoding process according to the MIMO reception schemes. The phase-shift-based precoding scheme according to the present invention has not been modified according to the MIMO reception scheme, such that a detailed description thereof will herein be omitted for the convenience of description.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As apparent from the above description, since the phase-shift-based precoding scheme solves the problems of the CDD, PSD, and precoding schemes, the present invention can implement effectively communication. Specifically, the present invention generalizes or extends the phase-shift-based precoding scheme, such that the design of the transmission/reception end is simplified and the communication efficiency can be more increased.

The present invention can change a flat-fading channel to a frequency-selective channel according to the phase shift diversity scheme based on the phase-shift-based precoding matrix. The present invention may acquire the frequency diversity gain via the channel code, or may acquire the multi-user diversity gain from the frequency-selective scheduling.

The present invention may additionally apply the Hermitian matrix of a unitary matrix to the phase-shift-based precoding matrix, or may apply the rotation matrix to the phase-shift-based precoding matrix, such that it reduces the complexity of the reception end but increases a decoding gain of the reception end.

The invention claimed is:

1. A data transmission method for a Multiple-Input Multiple-Output (MIMO) wireless access system using a plurality of sub-carriers, the method comprising:
determining, by a base station, a precoding matrix [W], the precoding matrix [W] being a part of a phase-shift-based precoding matrix [P];
determining, by the base station, a first diagonal matrix [D1] for phase shift, the first diagonal matrix [D1] being a part of the phase-shift-based precoding matrix [P];
determining, by the base station, a unitary matrix [U], the unitary matrix [U] being a part of the phase-shift-based precoding matrix [P];
precoding, by the base station, a transmission symbol per resource using the phase-shift-based precoding matrix [P] to generate precoded data; and
transmitting, by the base station, the precoded data to a mobile station,
wherein the phase-shift-based precoding matrix [P] is determined by a product of the precoding matrix [W], a Hermitian matrix of the unitary matrix $[U^H]$, the first diagonal matrix [D1], and the unitary matrix [U] in sequence as follows:

$[P]=[W][U^H][D1][U]$.

2. The method according to claim 1, further comprising:
determining a second diagonal matrix [D2] for phase shift, the second diagonal matrix [D2] being a part of the phase-shift-based precoding matrix [P],
wherein the phase-shift-based precoding matrix [P] is determined by a product of the second diagonal matrix [D2], the precoding matrix [W], the Hermitian matrix of the unitary matrix $[U^H]$, the first diagonal matrix [D1], and the unitary matrix [U] in sequence as follows:

$[P]=[D2][W][U^H][D1][U]$.

3. The method according to claim 2, wherein the first diagonal matrix [D1] and the second diagonal matrix [D2] use phase values for phase-shift independent of each other.

4. The method according to claim 3, further comprising:
controlling whether to use each of the first diagonal matrix [D1] and the second diagonal matrix [D2] using the phase values for phase-shift.

5. The method according to claim 1 or 2, wherein the product of the Hermitian matrix of the unitary matrix $[U^H]$, the first diagonal matrix [D1], and the unitary matrix [U] is a rotation matrix determined according to a spatial multiplexing rate (R).

6. The method according to claim 5, wherein the rotation matrix is configured to be changed according to resource index (k).

7. The method according to claim 5, wherein the rotation matrix is configured to be changed according to resource index (k), and the same rotation matrix is used for a predetermined 'I' number of consecutive resources.

8. The method according to claim 5, wherein whether to use the rotation matrix or not is determined by configuration.

9. A data reception method for a Multiple-Input Multiple-Output (MIMO) wireless access system using a plurality of sub-carriers, the method comprising:
determining, by a mobile station, a precoding matrix [W], the precoding matrix [W] being a part of a phase-shift-based precoding matrix [P];
determining, by the mobile station, a first diagonal matrix [D1] for phase shift, the first diagonal matrix [D1] being a part of the phase-shift-based precoding matrix [P];
determining, by the mobile station, a unitary matrix [U], the unitary matrix [U] being a part of the phase-shift-based precoding matrix [P];
receiving, by the mobile station, precoded data from a base station, the precoded data being generated according to the phase-shift-based precoding matrix [P]; and
decoding, by the mobile station, a corresponding sub-carrier symbol of the precoded data on a basis of the phase-shift-based precoding matrix [P],
wherein the phase-shift-based precoding matrix [P] is determined by a product of the precoding matrix [W], a Hermitian matrix of the unitary matrix $[U^H]$, the first diagonal matrix [D1], and the unitary matrix [U] in sequence as follows:

$[P]=[W][U^H][D1][U]$.

10. The method according to claim 9, further comprising:
determining a second diagonal matrix [D2] for phase shift, the second diagonal matrix [D2] being a part of the phase-shift-based precoding matrix [P],
wherein the phase-shift-based precoding matrix [P] is determined by a product of the second diagonal matrix

[D2], the precoding matrix [W], the Hermitian matrix of the unitary matrix [$U^H$], the first diagonal matrix [D1], and the unitary matrix [U] in sequence as follows:

[P]=[D2][W][$U^H$][D1][U].

11. The method according to claim 10, wherein the first diagonal matrix [D1] and the second diagonal matrix [D2] use phase values for phase-shift independent of each other.

12. The method according to claim 11, further comprising:
controlling whether to use each of the first diagonal matrix [D1] and the second diagonal matrix [D2] using the phase values for phase-shift.

13. The method according to claim 9 or 10, wherein a product of the Hermitian matrix of the unitary matrix [$U^H$], the first diagonal matrix [D1], and the unitary matrix [U] is determined according to a spatial multiplexing rate.

14. The method according to claim 13, wherein the rotation matrix is configured to be changed according to resource index (k).

15. The method according to claim 13, wherein the rotation matrix is configured to be changed according to resource index (k), and the same rotation matrix is used for a predetermined 'I' number of consecutive resources.

16. The method according to claim 13, wherein whether to use the rotation matrix or not is determined by configuration.

* * * * *